United States Patent
Park et al.

(10) Patent No.: US 12,309,491 B2
(45) Date of Patent: May 20, 2025

(54) FOLDABLE PORTABLE DEVICE

(71) Applicant: UIF (University Industry Foundation), Yonsei University, Seoul (KR)

(72) Inventors: Seung Han Park, Seoul (KR); Dae Yeon Kim, Incheon (KR); Jae Hoon Lee, Seoul (KR); Ha Rim Jeong, Gyeonggi-do (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 133 days.

(21) Appl. No.: 18/132,995

(22) Filed: Apr. 11, 2023

(65) Prior Publication Data

US 2023/0388630 A1     Nov. 30, 2023

(30) Foreign Application Priority Data

Apr. 11, 2022   (KR) .................. 10-2022-0044368

(51) Int. Cl.
*H04N 23/67* (2023.01)
*H04N 23/61* (2023.01)
*H04N 23/69* (2023.01)

(52) U.S. Cl.
CPC ........... *H04N 23/675* (2023.01); *H04N 23/61* (2023.01); *H04N 23/69* (2023.01)

(58) Field of Classification Search
CPC ...... H04N 23/675; H04N 23/61; H04N 23/69; H04N 23/81; H04N 23/45; H04N 23/55; H04N 23/673; H04N 23/67; G03B 17/04; G03B 13/36; G03B 17/12
See application file for complete search history.

(56) References Cited

U.S. PATENT DOCUMENTS

| | | | | |
|---|---|---|---|---|
| 9,942,466 | B2* | 4/2018 | Martin Perez | G02B 13/0015 |
| 10,142,526 | B2* | 11/2018 | Eromäki | G03B 17/04 |
| 10,412,281 | B2* | 9/2019 | Konttori | G03B 17/00 |
| 2010/0045855 | A1* | 2/2010 | Tanida | H04N 23/55 |
| | | | | 348/374 |
| 2017/0353633 | A1* | 12/2017 | Eromäki | H05K 5/0226 |
| 2017/0353643 | A1* | 12/2017 | Tuulos | H04N 23/67 |
| 2018/0007252 | A1* | 1/2018 | Tuulos | H04N 23/90 |
| 2022/0294950 | A1* | 9/2022 | Lee | H04N 23/60 |

OTHER PUBLICATIONS

Notice of Opinion Submission Dated Apr. 18, 2024 From the Korean Patent Office Re. Application No. 10-2022-0044369 and Its Translation Into English. (7 Pages).

* cited by examiner

*Primary Examiner* — Albert H Cutler

(57) ABSTRACT

A foldable portable device is disclosed. The foldable portable device according to the present invention includes a first body provided with a first lens configured to recognize an object and a first image sensor configured to detect an image of the object recognized by the first lens, a second body coupled to the first body to be folded toward the first body and provided with a second lens configured to adjust a focus for the object recognized through the first lens, and a first controller provided in the second body and configured to adjust a magnification of the object focused by the second lens, wherein the first lens and the second lens are provided to have the same optical path when the second body is folded toward the first body and overlaps the first body.

15 Claims, 4 Drawing Sheets

[FIG. 1]
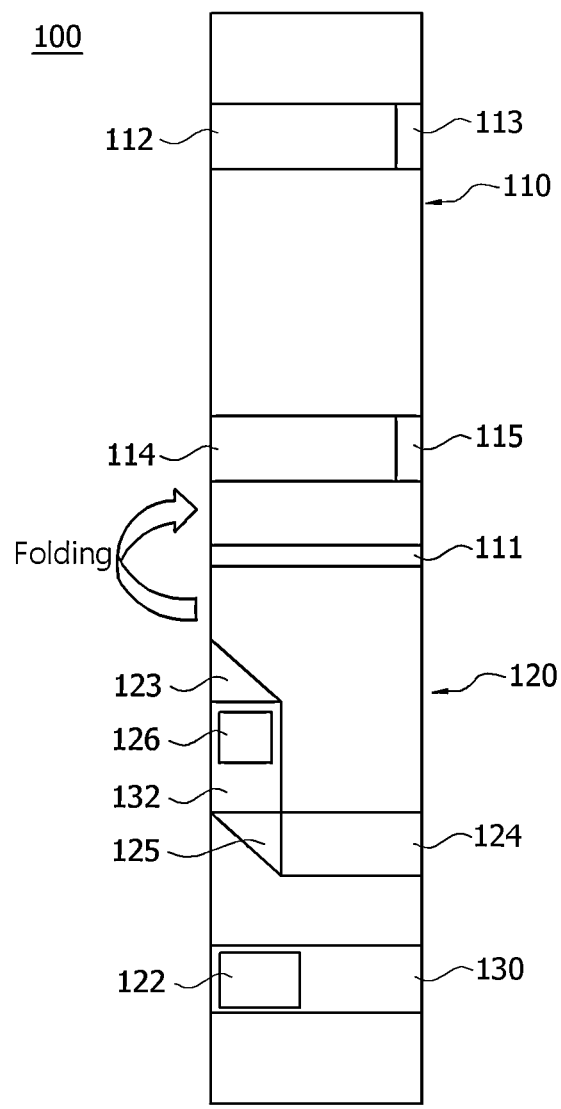

[FIG. 2]
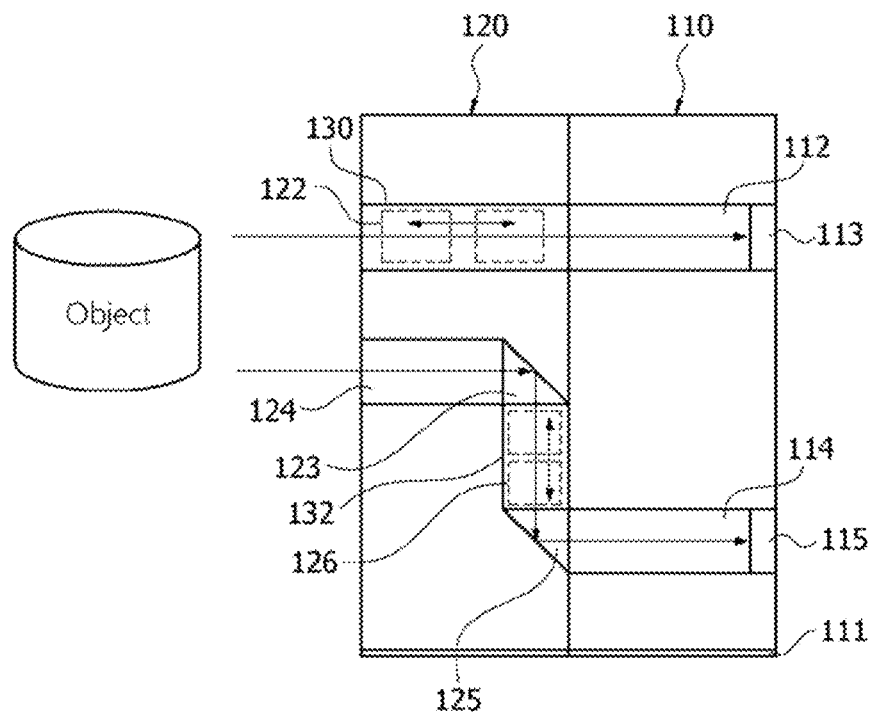
[FIG. 3]
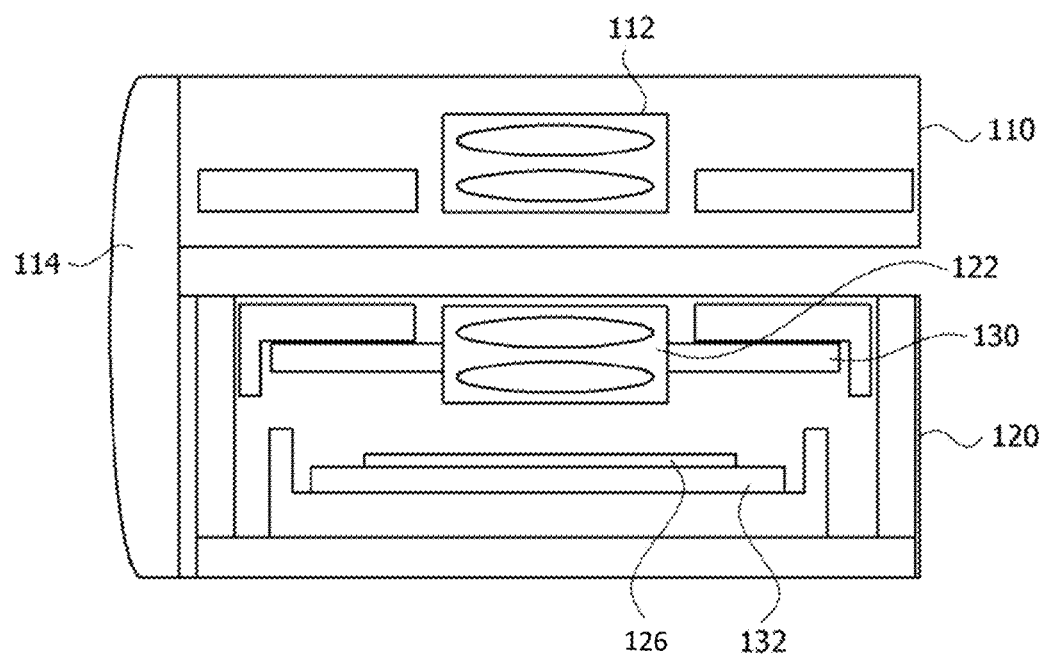

[FIG. 4]
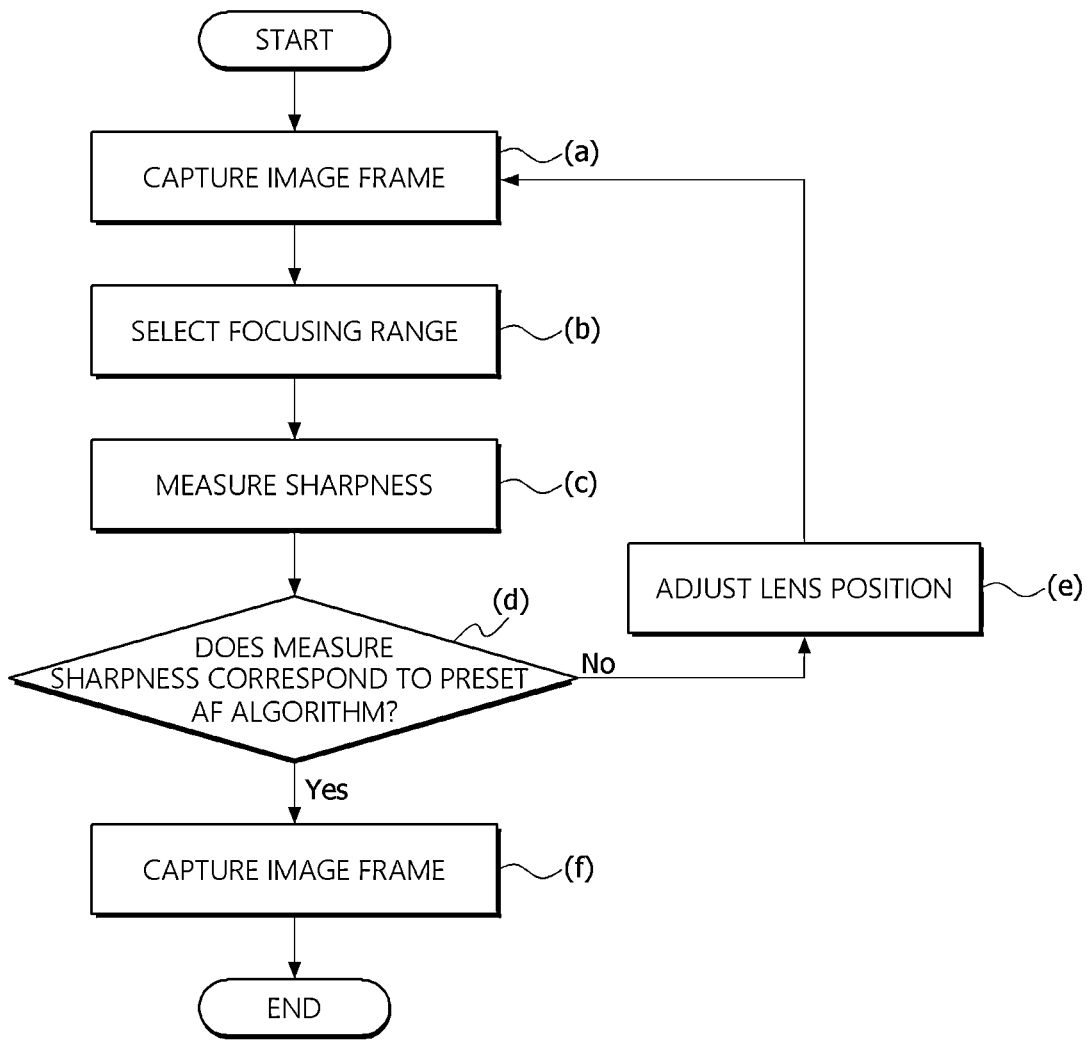

[FIG. 5]
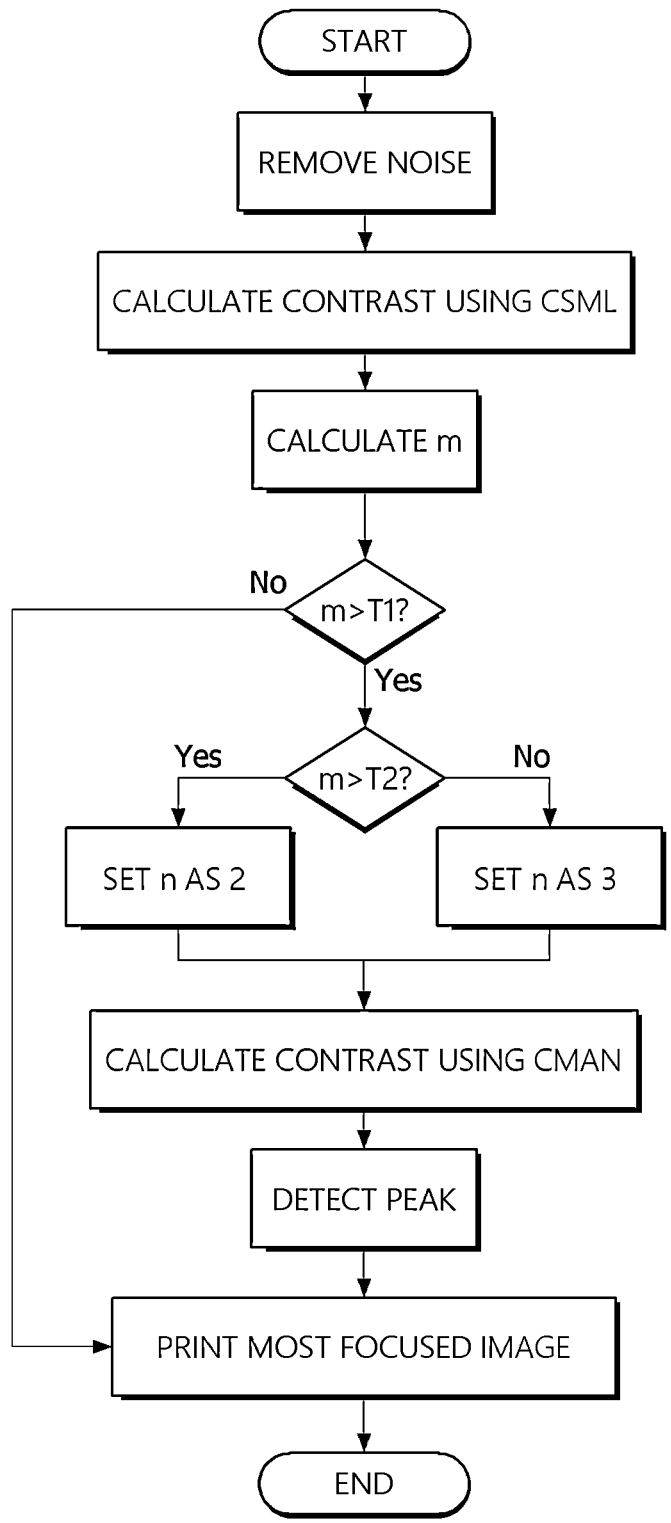

FOLDABLE PORTABLE DEVICE

CROSS-REFERENCE TO RELATED APPLICATION

This application claims the benefit of priority of Korean Patent Application No. 2022-0044368, filed on 11 Apr. 2022, the contents of which are incorporated by reference as if fully set forth herein in their entirety.

FIELD AND BACKGROUND OF THE INVENTION

1. Field of the Invention

The present invention relates to a foldable portable device, and more specifically, to a foldable portable device in which an imaging device is foldable and a plurality of different types of lenses are inserted into and installed in the imaging device to variously capture an image in a folded state of the imaging device.

2. Discussion of Related Art

With the rapid development of communication technology and the widespread supply of cell-phones, most people own at least one portable device such as the cell-phone.

Accordingly, such portable devices are manufactured to perform various additional functions in addition to high-performance communication functions.

In addition, since a camera function for capturing an image is basically performed in the portable device, an image or video image can be captured using a camera installed in the portable device.

However, since the camera mounted in the conventional portable device includes a unifocal lens with a constant focal length, it is difficult to capture a long-distance image or a wide-angle image, and thus there is a problem of degrading the usability of the camera embedded in an imaging device.

Recently, accessories including lenses have been additionally attached to the imaging device, or lenses for long-distance image capturing or wide-angle image capturing have been inserted into and installed in the imaging device.

However, in the case of the lens accessories attached to the portable device, there are cumbersome problems that the lens accessories should be carried separately and mounted on the imaging device as necessary.

In addition, when a plurality of types of lenses are inserted into and installed in the portable device, manufacturing costs of the portable device increase, a price increases, and thus it is difficult for ordinary consumers to purchase. In addition, when various types of lenses are inserted into and installed in the portable device, a size increases, and a weight of the imaging device becomes heavier due to the increased size, and thus it is difficult to carry.

In addition, when various types of lenses are inserted into and installed in the portable device, since a lens protrudes rearward from the imaging device, there is a risk that foreign matter can be attached onto the protruding lens, or cracks in or damage to the protruding lens can occur.

Accordingly, there is a need for developing a foldable portable device which is folded and reduced in size and into which different types of lenses are inserted and installed so that a user easily captures a picture and moving images.

SUMMARY OF THE INVENTION

The present invention is directed to providing a foldable portable device in which an imaging device can be folded and a plurality of lenses can be inserted into and installed in the imaging device to variously capture an image even in a folded state of the imaging device.

Objectives to be addressed by the present invention are not limited to the above-described objectives, and other objectives, which are not described, will be clearly understood by those skilled in the art from the following description.

According to an aspect of the present invention, there is provided a foldable portable device including a first body provided with a first lens configured to recognize an object and a first image sensor configured to detect an image of the object recognized by the first lens, a second body coupled to the first body to be folded toward the first body and provided with a second lens configured to adjust a focus for the object recognized through the first lens, and a first controller provided in the second body and configured to adjust a magnification of the object focused by the second lens, wherein the first lens and the second lens are provided to have the same optical path when the second body is folded toward the first body and overlaps the first body.

When the second body is folded and overlaps the first body, the first controller may perform axis correction on the first lens and the second lens, which have the same optical path, to have the same axis.

The first controller may be provided to move the second lens in a left-right direction to adjust the magnification of the object focused by the second lens.

The second body may include a third lens configured to recognize the object and disposed to be space a predetermined distance from the second lens, a fourth lens configured to adjust a focus for the object recognized through the third lens, and a first path change member and a second path change member which are provided on two end portions of the fourth lens and configured to change a path of light incident on the fourth lens through the third lens.

A second controller configured to adjust the magnification of the object focused by the fourth lens may be further provided in the second body.

The second controller may be provided to vertically move the fourth lens to adjust the magnification of the object focused by the fourth lens.

The first body may further include a fifth lens disposed to be spaced a predetermined distance from the first lens to recognize the object at an angle different from that of the first lens. When the second body overlaps the first body, the path of the light incident through the third lens may be changed by the first path change member to be incident on the fourth lens, and the path of the light incident on the fourth lens may be changed by the second path change member to be incident on the fifth lens.

The second controller may perform axis correction so that the light, which is incident on the fourth lens and of which the path is changed by the second path change member, and the fifth lens have the same axis while the second body is folded and overlaps the first body.

A magnification range of the object focused by the fourth lens may be changed according to a length of an optical path of the third lens.

The first path change member and the second path change member may be disposed on the two end portions in different directions.

A second image sensor provided on an end portion of the fifth lens and configured to detect an image of the object recognized by the fourth lens and the fifth lens may be further provided in the first body.

According to another aspect of the present invention, there is provided a method of performing axis correction on a foldable portable device, the method including capturing image frames detected by image sensors, selecting a focusing range of a preset region among the captured image frames, measuring a sharpness in the selected focusing range, and determining the measured sharpness based on a peak algorithm of auto focus (AF).

The determining based on the peak algorithm may further include adjusting a position of a lens when a level of the measured sharpness does not reach a set value of a preset AF algorithm.

According to still another aspect of the present invention, there is provided a foldable portable device including a first body provided with a first lens configured to recognize an object and a first image sensor configured to detect an image of the object recognized by the first lens, a second body coupled to the first body to be folded toward the first body and provided with which a second lens configured to adjust a focus for the object recognized through the first lens, a first controller provided in the second body and configured to adjust a magnification of the object focused by the second lens, a fifth lens provided in the first body and disposed to be spaced a predetermined distance from the first lens to recognize the object at an angle different from that of the first lens, a third lens provided in the second body to recognize the object and disposed to be spaced a predetermined distance from the second lens, a fourth lens configured to adjust a focus for the object recognized through the third lens, and a first path change member and a second path change member which are provided on two end portions of the fourth lens and configured to change a path of light incident on the fourth lens through the third lens, wherein, when the second body overlaps the first body, the path of the light incident through the third lens is changed by the first path change member to be incident on the fourth lens, and the path of the light incident on the fourth lens is changed by the second path change member to be incident on the fifth lens, and, when the second body is folded and overlaps the first body, the first controller is provided to perform axis correction on the first lens and the second lens, which have the same optical path, to have the same axis.

A second controller may be provided to perform axis correction so that the light, which is incident on the fourth lens and of which the path is changed by the second path change member, and the fifth lens have the same axis while the second body is folded and overlaps the first body.

The foldable portable device may further include a second image sensor provided on an end portion of the fifth lens and configured to detect an image of the object recognized through the third lens, the fourth lens, and the fifth lens.

A foldable portable device of the present invention has advantages of being foldable and easily variously capturing an image using lenses inserted into and installed in an imaging device in a folded state.

In addition, since a foldable portable device of the present invention can automatically perform axis correction during image capturing while the foldable portable device is folded, there is an effect of improving the reliability of a captured image.

Effects of the present invention are not limited to those described above, and other effects, which are not described, will be clearly understood by those skilled in the art from the above detailed description.

BRIEF DESCRIPTION OF THE SEVERAL VIEWS OF THE DRAWINGS

The above and other objects, features and advantages of the present invention will become more apparent to those of ordinary skill in the art by describing exemplary embodiments thereof in detail with reference to the accompanying drawings, in which:

FIG. 1 is a view illustrating a foldable portable device according to one embodiment of the present invention;

FIG. 2 is a view illustrating a state in which the foldable portable device illustrated in FIG. 1 is folded;

FIG. 3 is a schematic view illustrating an internal structure of the foldable portable device illustrated in FIG. 2;

FIG. 4 is a flowchart illustrating an axis correction method using the foldable portable device according to one embodiment of the present invention; and FIG. 5 is a flowchart for briefly describing an autofocus (AF) algorithm illustrated in FIG. 4.

DESCRIPTION OF SPECIFIC EMBODIMENTS OF THE INVENTION

Hereinafter, various embodiments of the present invention will be described in detail with reference to the accompanying drawings in order for those skilled in the art to easily perform the present invention. The present invention may be implemented in several different forms and is not limited to the embodiments described herein.

The drawings are schematic and are not illustrated according to a magnification factor. Relative dimensions and ratios of portions in the drawings are exaggerated or reduced in size for the sake of clarity and convenience in the drawings, and some dimensions are only exemplary and are not for limitation. In addition, the same reference numerals will be assigned to the same structures, elements, or components illustrated in two or more drawings to denote the similar features.

Embodiments of the present invention specifically represent ideal embodiments of the present invention. Accordingly, various modifications of the drawings are expected. Accordingly, the embodiments are not limited to specific shapes of illustrated regions and also include, for example, modifications of the shapes while manufacturing.

Hereinafter, a foldable portable device 100 (hereinafter, referred to as a "portable device") according to one embodiment of the present invention will be described with reference to FIGS. 1 to 5.

The portable device 100 according to one embodiment of the present invention may be a foldable cell-phone, a tablet computer, or the like having an image or video capturing function.

For reference, for the sake of convenience of description, the portable device 100 will be limited to and described as a foldable cell-phone which is generally widely used.

First, referring to FIGS. 1 to 3, the portable device 100 according to one embodiment of the present invention includes a first body 110, a second body 120, and a first controller 130.

The first body 110 is a part which recognizes an object.

In this case, a first lens 112 is provided in the first body 110.

The first lens 112 may be a lens generally mounted in a cell-phone. The first lens 112 may include a plurality of different types of lenses, and, for example, five or six lenses may be combined and provided as the first lens 112.

A first image sensor 113 may be further provided on an end portion of the first lens 112.

The first image sensor 113 is a sensor which detects an image of an object recognized by the first lens 112.

In this case, since the first image sensor 113 should detect an image of the object recognized by the first lens 112, the first image sensor 113 may be provided as an image sensor having the same number of pixels as the first lens 112.

In addition, a fifth lens 114 may be further provided on the first body 110.

The fifth lens 114 is disposed to be spaced a predetermined distance from the first lens 112 and recognizes the object from a position (or angle) different from that of the first lens 112.

Like the first lens 112, the fifth lens 114 may be a lens generally mounted on a cell-phone and may include a plurality of different types of lenses. For reference, five or six lenses may be combined and provided as the fifth lens 114.

A second image sensor 115 may be further provided on an end portion of the fifth lens 114.

The second image sensor 115 is a sensor which detects an image of the object recognized by a third lens 124 and a fourth lens 126, which will be described below, and the fifth lens 114. In this case, since the second image sensor 115 should detect the image of the object recognized by the fifth lens 114, the second image sensor 115 may be provided as an image sensor having the same number of pixels as the fifth lens 114.

The second body 120 is a part which is coupled to an end portion of the first body 110 and recognizes the object at an angle different from that of the first body 110.

A second lens 122 is provided on the second body 120.

The second lens 122 is a part for adjusting a focus for the object recognized through the first lens 112.

For example, the second lens 122 may be provided as a macro lens capable of capturing an image of a close object or as a telephoto lens capable of capturing an image of a distant object but is not necessarily limited thereto.

The second lens 122 is controlled by the first controller 130.

The first controller 130 is provided on the second body 120, and a magnification of the object focused by the second lens 122 is adjusted in conjunction with the second lens 122.

In this case, the second body 120 is coupled to a lower end portion of the first body 110 using a folding part 111 to be folded toward the first body 110.

In particular, when the second body 120 is folded toward the first body 110 and overlaps the first body 110, the first lens 112 and the second lens 122 have the same optical path.

However, when the second body 120 is folded toward the first body 110, a manufacturing tolerance is generated due to the folding part 111, and a tolerance by which a folding position is slightly changed is generated whenever the second body 120 is folded toward the first body 110.

Then, optical paths of the second lens 122 and the first lens 112, which should be the same, may be misaligned, and thus there is a problem that the object is inaccurately recognized. Accordingly, it is necessary to perform axis correction on the second lens 122 and the first lens 112 to have the same optical path.

The first controller 130 performs axis correction on the second lens 122 and the first lens 112.

In other words, when the second body 120 is folded and overlaps the first body 110, the first controller 130 performs axis correction on the first lens 112 and the second lens 122, which have the same optical path, to have the same axis.

For example, the first controller 130 is an actuator which feedbacks an auto focus problem due to the folding of the second body 120 toward the first body 110 to software data to perform axis correction so as to perform auto focusing, and thus an image of a recognized object is adjusted by the first controller 130.

As described above, since the first controller 130 moves the second lens 122 in a left-right direction to adjust a magnification of a focused object, not only close-up and telephoto imaging functions but also an optical zoom function for an object can be performed.

For reference, a method of performing axis correction on the first lens 112 and the second lens 122 using the first controller 130 will be described in detail below.

Meanwhile, an image of the object recognized through the second lens 122 and the first lens 112 is detected by the first image sensor 113.

Accordingly, the second lens 122 may be provided as an image sensor having the same number of pixels as the first image sensor 113.

Meanwhile, the second body 120 may further include the third lens 124, the fourth lens 126, and path change members 123 and 125.

The third lens 124 is a part disposed to be spaced a predetermined distance from the second lens 122 to recognize the object from a position (or angle) different from that of the second lens 122.

The third lens 124 may be a lens which is generally mounted on a cell-phone and may include a plurality of different types of lenses. For example, five or six lenses may be combined and provided as the third lens 124.

The fourth lens 126 is a part connected to the third lens 124 to adjust a focus for the object recognized through the third lens 124.

To this end, the fourth lens 126 may be provided as a macro lens capable of capturing an image of a close object or a telephoto lens capable of capturing an image of a distant object but is not necessarily limited thereto.

In this case, when the second body 120 is folded toward the first body 110 and overlaps the first body 110, one end portion of the fourth lens 126 is connected to the third lens 124, and the other end portion of the fourth lens 126 is connected to the fifth lens 114.

That is, light incident through the third lens 124 has a path along which the light is incident on the fourth lens 126, then is incident on the fifth lens 114, and is detected by the second image sensor 115.

In this case, the third lens 124 is positioned parallel to the second lens 122 in the second body 120, and the fourth lens 126 is connected to the third lens 124 and the fifth lens 114 in a state in which the fourth lens 126 is disposed in a direction perpendicular to the third lens 124.

Meanwhile, the light incident through the third lens 124 should be incident on the fourth lens 126 after the path is changed once, and the light incident on the fourth lens 126 should be incident on the fifth lens 114 after the path is changed finally.

To this end, the path change members 123 and 125 for changing a path of light incident on the third lens 124 are additionally provided on two end portions of the fourth lens 126.

For example, the path change members 123 and 125 are provided as prisms but are not necessarily limited thereto and may be changed to any members which may change a path of light incident through the third lens 124.

The path change members 123 and 125 include a first path change member 123 provided on one end portion of the fourth lens 126 and a second path change member 125 provided on the other end portion of the fourth lens 126.

In particular, the first path change member 123 and the second path change member 125 are disposed on the two end portions of the fourth lens 126 in different directions.

For example, the first path change member 123 changes a path of light incident through the third lens 124 in a downward direction so that the light is incident on the fourth lens 126.

The second path change member 125 changes a path of light incident on the fourth lens 126 in a right direction so that the light is incident on the fifth lens 114.

Meanwhile, an image of the object recognized through the fourth lens 126, which is related to the third lens 124, and the fifth lens 114 is detected through the second image sensor 115.

Accordingly, the third lens 124 and the fourth lens 126 may be provided as image sensors each having the same number of pixels as the second image sensor 115.

As described above, when the second body 120 is folded toward the first body 110 and overlaps the first body 110, the third lens 124, the fourth lens 126, and the fifth lens 114 have the same optical path.

However, when the second body 120 is folded toward the first body 110, the manufacturing tolerance is generated due to the folding part 111, and the tolerance by which the folding position is slightly changed is generated whenever the second body 120 is folded toward the first body 110.

Accordingly, optical paths of the third lens 124, the fourth lens 126, and the fifth lens 114, which should have the same optical path, may be misaligned, and thus there is a problem that the object is inaccurately recognized.

In order to solve the above problem, axis correction should be performed on the third lens 124, the fourth lens 126, and the fifth lens 114 to have the same optical path.

The axis correction may be performed by a second controller 132 provided in the second body 120.

The second controller 132 is connected to the fourth lens 126 and adjusts a magnification of the object focused by the fourth lens 126.

In particular, when the second body 120 is folded and overlaps the first body 110, the second controller 132 performs axis correction on the third lens 124, the fourth lens 126, and the fifth lens 114, which have the same optical path, to have the same axis.

The second controller 132 is an actuator which feedbacks an auto focus problem due to the folding of the second body 120 toward the first body 110 to software data to perform the axis correction so as to perform auto focusing, and thus an image of an object recognized by the fourth lens 126 is adjusted by the second controller 132.

For reference, a method of performing axis correction on the third lens 124, the fourth lens 126, and the fifth lens 114 by the second controller 132 will be described in detail below.

In addition, since the second controller 132 vertically moves the fourth lens 126 to adjust the magnification of the object focused by the fourth lens 126, not only close-up and telephoto imaging functions but also an optical zoom function for an object can be performed.

Meanwhile, a magnification range of the object focused by the fourth lens 126 is changed by the third lens 124 connected to the fourth lens 126.

For example, as a length of the optical path of the third lens 124 increases, the magnification range of the object enlarged by the fourth lens 126 increases, and as the length of the optical path of the third lens 124 decreases, the magnification range of the object enlarged by the fourth lens 126 decreases.

Accordingly, it is necessary to appropriately adjust the length of the optical path of the third lens 124.

When the second body 120 is folded toward the first body 110, an internal structure of the foldable portable device 100 may be shown as in FIG. 3, but is not necessarily limited thereto.

Hereinafter, a method of performing axis correction on lenses using the first controller 130 and the second controller 132 of the foldable portable device 100 according to one embodiment of the present invention will be described with reference to FIG. 4.

First, image frames detected by the first image sensor 113 and the second image sensor 115 are captured (a).

Then, a focusing range of the captured image frames is selected (b).

Then, a sharpness is measured in the selected focusing range (c).

In this case, whether the measured sharpness corresponds to a preset auto focus (AF) algorithm is determined (d).

When, it is determined that the measured sharpness does not correspond to the preset AF algorithm, a position of a lens is adjusted (e).

In this case, the adjusted position of the lens may be a position of any one of the first lens 112 and the second lens 122, or any one of the third lens 124 and the fourth lens 126.

However, when it is determined that the measured sharpness corresponds to the preset AF algorithm, an image frame is captured without additionally adjusting the position of the lens (f).

In this case, when it is determined that the measured sharpness corresponds to the preset AF algorithm, the image according to the appropriate position of the lens may be very clear. On the other hand, when the measured sharpness does not correspond to the preset AF algorithm, the image detected by the lens may be unclear and out of focus.

For reference, the AF algorithm will be briefly described with reference to FIG. 5.

The AF algorithm is a passive algorithm using contrast measure adaptive to noise influence (CMAN).

First, noise is removed from captured images.

The noise means an image which is out of focus or unclear among captured images.

Then, a contrast is calculated using CMSL.

In this case, CMSL is an abbreviation of constant measure based on squared Laplacian and is a contrast measurement method based on Laplacian.

Then, m is calculated.

For reference, when contrast of the captured images is measured, m is the local maximum number of regions at which m is a threshold value, that is, the captured images are in focus.

In this case, m is compared with a parameter T1.

When the calculated m is less than the parameter T1, a well-defined peak may be observed as a maximum contrast value representing a most focused image.

On the other hand, when it is determined that the calculated m is greater than the parameter T1, m is compared with a parameter T2.

As described above, when m is less than the parameter T2, a parameter n may be obtained.

In this case, when m is less than the parameter T2, a setting value of the parameter n is set to 2. In addition, when m is greater than the parameter T2, the setting value of the parameter n is set to 3.

For reference, the parameter T1 denotes a minimum range of arbitrarily preset m, and the parameter T2 denotes a maximum range of arbitrarily preset m. That is, it may be described as the parameter T1<m>the parameter T2.

Accordingly, m is to determine what extent calibration is performed on an image within the range of the parameter T1 to the parameter T2.

Then, the contrast is calculated using CMAN.

CMAN is an abbreviation of contrast measure adaptive to noise influence and which is a method of measuring contrast for noise effect.

The contrast measuring method using CMAN is more slightly complicated than CMSL, but a time required to calculate contrast is acceptable, and generally, there is an advantage of no delay in the passive AF algorithm (system).

In addition, effects of noise and most focused peaks which are important for securing focus accuracy and reliability may be checked through the additional contrast calculation using CMAN. That is, in the case of a low-light condition, it may be a measurement value suitable for measuring efficiency of the passive AF algorithm which improves performance.

Then, a peak is detected.

Finally, an image determined as a most focused image is selected and printed.

According to the above configuration, the foldable portable device 100 according to one embodiment of the present invention has an advantage of being folded and easily variously capturing an image using lenses inserted into and installed in the imaging device in the folded state.

In addition, the foldable portable device 100 according to one embodiment of the present invention has an effect of automatically performing axis correction when capturing an image in the folded state of the device to improve the reliability of the captured image.

A foldable portable device of the present invention has advantages of being foldable and easily variously capturing an image using lenses inserted into and installed in an imaging device in a folded state.

In addition, since a foldable portable device of the present invention can automatically perform axis correction during image capturing while the foldable portable device is folded, there is an effect of improving the reliability of a captured image.

While one embodiment of the present invention has been described with reference to specific details such as detailed components, these are provided only to facilitate overall understanding of the present invention, and the present invention is not limited thereto and may be variously modified and changed by those skilled in the art. Therefore, the spirit and scope of the present invention are defined not by the detailed description of the present invention but by the appended claims, and encompasses all modifications and equivalents that fall within the scope of the appended claims.

What is claimed is:

1. A foldable portable device comprising:
   a first body provided with a first lens configured to recognize an object and a first image sensor configured to detect an image of the object recognized by the first lens;
   a second body coupled to the first body to be folded toward the first body and provided with a second lens configured to adjust a focus for the object recognized through the first lens; and
   a first controller provided in the second body and configured to adjust a magnification of the object focused by the second lens,
   wherein the first lens and the second lens are provided to have the same optical path when the second body is folded toward the first body and overlaps the first body,
   wherein the second body comprises:
   a third lens configured to recognize the object and disposed to be space a predetermined distance from the second lens;
   a fourth lens configured to adjust a focus for the object recognized through the third lens; and
   a first path change member and a second path change member which are provided on two end portions of the fourth lens and configured to change a path of light incident on the fourth lens through the third lens.

2. The foldable portable device of claim 1, wherein, when the second body is folded and overlaps the first body, the first controller performs axis correction on the first lens and the second lens, which have the same optical path, to have the same axis.

3. The foldable portable device of claim 1, wherein the first controller is provided to move the second lens in a left-right direction to adjust the magnification of the object focused by the second lens.

4. The foldable portable device of claim 1, wherein a second controller configured to adjust the magnification of the object focused by the fourth lens is further provided in the second body.

5. The foldable portable device of claim 4, wherein the second controller is provided to vertically move the fourth lens to adjust the magnification of the object focused by the fourth lens.

6. The foldable portable device of claim 5, wherein:
   the first body further includes a fifth lens disposed to be spaced a predetermined distance from the first lens to recognize the object at an angle different from that of the first lens; and
   when the second body overlaps the first body, the path of the light incident through the third lens is changed by the first path change member to be incident on the fourth lens, and the path of the light incident on the fourth lens is changed by the second path change member to be incident on the fifth lens.

7. The foldable portable device of claim 6, wherein the second controller performs axis correction so that the light, which is incident on the fourth lens and of which the path is changed by the second path change member, and the fifth lens have the same axis while the second body is folded and overlaps the first body.

8. The foldable portable device of claim 6, wherein a magnification range of the object focused by the fourth lens is changed according to a length of an optical path of the third lens.

9. The foldable portable device of claim 6, wherein the first path change member and the second path change member are disposed on the two end portions in different directions.

10. The foldable portable device of claim 6, wherein a second image sensor provided on an end portion of the fifth lens and configured to detect an image of the object recognized by the third lens, the fourth lens, and the fifth lens is further provided in the first body.

11. A method of performing axis correction on the foldable portable device of claim 4, the method comprising:
   capturing image frames detected by image sensors;
   selecting a focusing range of a preset region among the captured image frames;
   measuring a sharpness in the selected focusing range; and
   determining the measured sharpness based on a peak algorithm of auto focus (AF).

12. The method of claim 11, wherein the determining based on the peak algorithm further includes adjusting a position of a lens when a level of the measured sharpness does not reach a set value of a preset AF algorithm.

13. A foldable portable device comprising:
- a first body provided with a first lens configured to recognize an object and a first image sensor configured to detect an image of the object recognized by the first lens;
- a second body coupled to the first body to be folded toward the first body and provided with a second lens configured to adjust a focus for the object recognized through the first lens;
- a first controller provided in the second body and configured to adjust a magnification of the object focused by the second lens;
- a fifth lens provided in the first body and disposed to be spaced a predetermined distance from the first lens to recognize the object at an angle different from that of the first lens;
- a third lens provided in the second body to recognize the object and disposed to be spaced a predetermined distance from the second lens to recognize the object at an angle different from that of the first lens;
- a fourth lens configured to adjust a focus for the object recognized through the third lens; and
- a first path change member and a second path change member which are provided on two end portions of the fourth lens and configured to change a path of light incident on the fourth lens through the third lens,
- wherein, when the second body overlaps the first body, the path of the light incident through the third lens is changed by the first path change member to be incident on the fourth lens, and the path of the light incident on the fourth lens is changed by the second path change member to be incident on the fifth lens, and
- when the second body is folded and overlaps the first body, the first controller is provided to perform axis correction on the first lens and the second lens, which have the same optical path, to have the same axis.

14. The foldable portable device of claim 13, wherein a second controller is provided to perform axis correction so that the light, which is incident on the fourth lens and of which the path is changed by the second path change member, and the fifth lens have the same axis while the second body is folded and overlaps the first body.

15. The foldable portable device of claim 13, further comprising a second image sensor provided on an end portion of the fifth lens and configured to detect an image of the object recognized through the third lens, the fourth lens, and the fifth lens.

* * * * *